(12) United States Patent
Farrar et al.

(10) Patent No.: US 6,206,453 B1
(45) Date of Patent: Mar. 27, 2001

(54) WINDOW PROTECTOR ASSEMBLY

(75) Inventors: Jerry Farrar, Banning; Dale E. Carson, Murrieta, both of CA (US)

(73) Assignee: Transit Care, Inc., Riverside, CA (US)

( * ) Notice: Subject to any disclaimer, the term of this patent is extended or adjusted under 35 U.S.C. 154(b) by 0 days.

(21) Appl. No.: 09/397,748

(22) Filed: Sep. 16, 1999

(51) Int. Cl.$^7$ .................................................. B60J 1/10
(52) U.S. Cl. ........................... 296/146.15; 296/146.16; 296/201; 49/504
(58) Field of Search ................... 296/190.1, 146.15, 296/146.16, 95.1, 201; 49/504; 52/768, 204.66

(56) References Cited

U.S. PATENT DOCUMENTS

| | | |
|---|---|---|
| 1,533,731 | 4/1925 | Foley . |
| 1,828,515 | 10/1931 | Stone . |
| 1,945,742 | 2/1934 | Hilger . |
| 1,973,792 | 9/1934 | Barrows . |
| 1,977,899 | 10/1934 | Shapiro et al. . |
| 2,163,566 | 6/1939 | Blessin . |
| 2,221,005 | 11/1940 | Reese . |
| 2,267,542 | 12/1941 | Walz . |
| 2,371,430 | 3/1945 | de Patto . |
| 2,667,378 | 1/1954 | Holme-Shaw . |
| 3,004,305 | 10/1961 | Goodemote et al. . |
| 3,025,098 | 3/1962 | Andrews . |
| 3,140,115 | 7/1964 | Bliss . |
| 3,266,560 | 8/1966 | Mooskian . |
| 3,312,023 | 4/1967 | Zell . |
| 3,599,596 | 8/1971 | Remus et al. . |
| 3,656,798 | 4/1972 | Dodgen et al. . |
| 3,686,795 | * 8/1972 | La Barge ............................ 49/504 |
| 3,704,563 | 12/1972 | Waller . |
| 3,774,363 | 11/1973 | Kent . |
| 3,869,198 | 3/1975 | Ballentine . |
| 3,923,339 | 12/1975 | McDonald . |
| 3,925,947 | 12/1975 | Meyers et al. . |
| 3,959,941 | 6/1976 | Smith . |
| 3,971,178 | 7/1976 | Mazzoni et al. . |
| 4,196,545 | 4/1980 | Korany et al. . |
| 4,205,486 | * 6/1980 | Guarnacci ............................ 49/504 |
| 4,248,018 | * 2/1981 | Casamayor ........................... 49/504 |
| 4,261,649 | 4/1981 | Richard . |
| 4,280,414 | * 7/1981 | Allshouse et al. ................. 296/95.1 |
| 4,292,771 | * 10/1981 | Ellis ..................................... 49/504 |
| 4,328,644 | * 5/1982 | Scott et al. ........................... 49/504 |
| 4,331,359 | 5/1982 | Sheldon . |
| 4,332,412 | 6/1982 | Nakazawa et al. . |
| 4,349,993 | 9/1982 | Tanaka et al. . |
| 4,358,488 | 11/1982 | Dunklin et al. . |
| 4,364,209 | 12/1982 | Gebhard . |

(List continued on next page.)

FOREIGN PATENT DOCUMENTS

| | | |
|---|---|---|
| 2038176 | 9/1971 | (DE) . |
| 106 629 | 4/1984 | (EP) . |
| 715795 | 9/1954 | (GB) . |

Primary Examiner—Joseph D. Pape
Assistant Examiner—Kiran Patel
(74) Attorney, Agent, or Firm—Knobbe, Martens, Olson & Bear, LLP

(57) ABSTRACT

A window protector assembly having pivoting retaining members that can be pivotally attached to a frame defining an opening that is adapted to receive the glazing of the window and also one or more protective layers. In one embodiment, an outer protective layer and an inner protective layer are positioned within the opening with the glazing interposed between the outer protective layer and the inner protective layer. The pivoting retaining members are adapted to move between an opened position wherein the protective layers and the glazing can be removed from the window and a closed positioned wherein the retaining members secure the protective layers and the glazing within the opening of the window frame. The pivoting retaining members further include a securing mechanism to secure the protective members within the window frames.

22 Claims, 5 Drawing Sheets

U.S. PATENT DOCUMENTS

| | | | |
|---|---|---|---|
| 4,364,595 | * | 12/1982 | Morgan et al. ............... 296/146.15 |
| 4,430,831 | * | 2/1984 | Kemp ..................... 49/504 |
| 4,474,403 | | 10/1984 | Miller . |
| 4,478,003 | | 10/1984 | Flett . |
| 4,494,342 | | 1/1985 | Decker . |
| 4,543,283 | | 9/1985 | Curtze et al. . |
| 4,555,867 | * | 12/1985 | Stibolt ..................... 49/504 |
| 4,555,869 | * | 12/1985 | Kenkel ..................... 49/504 |
| 4,562,666 | | 1/1986 | Young, III . |
| 4,663,885 | * | 5/1987 | Stibolt ..................... 49/504 |
| 4,673,609 | | 6/1987 | Hill . |
| 4,726,149 | | 2/1988 | Tryba . |
| 4,763,454 | | 8/1988 | Brockhaus . |
| 4,768,823 | | 9/1988 | Martinez . |
| 4,823,511 | | 4/1989 | Herliczek et al. . |
| 4,940,622 | | 7/1990 | Leavitt, Sr. et al. . |
| 4,967,507 | * | 11/1990 | Vismic et al. ..................... 49/504 |
| 4,989,912 | | 2/1991 | Furman . |
| 4,991,349 | * | 2/1991 | Barthelemy ..................... 49/504 |
| 5,002,326 | | 3/1991 | Westfield et al. . |
| 5,046,284 | * | 9/1991 | Harper ..................... 49/504 |
| 5,062,248 | | 11/1991 | Kunert . |
| 5,081,793 | * | 1/1992 | Mauro ..................... 49/504 |
| 5,150,943 | * | 9/1992 | Gold ..................... 296/201 |
| 5,176,420 | | 1/1993 | Kato . |
| 5,242,207 | * | 9/1993 | Carson et al. ............... 296/146.15 |
| 5,396,746 | | 3/1995 | Whitmer . |
| 5,525,177 | | 6/1996 | Ross . |
| 5,584,526 | | 12/1996 | Soldner . |
| 5,609,938 | | 3/1997 | Shields . |
| 5,671,491 | | 9/1997 | Ladd . |
| 5,679,435 | | 10/1997 | Andriash . |
| 5,735,089 | | 4/1998 | Smith et al. . |
| 5,768,837 | | 6/1998 | Sjoholm . |
| 5,809,707 | | 9/1998 | Bargados et al. . |
| 5,893,600 | * | 4/1999 | McManus ............... 296/146.16 |
| 6,007,899 | * | 12/1999 | Yoshizawa et al. ............ 296/146.15 |

* cited by examiner

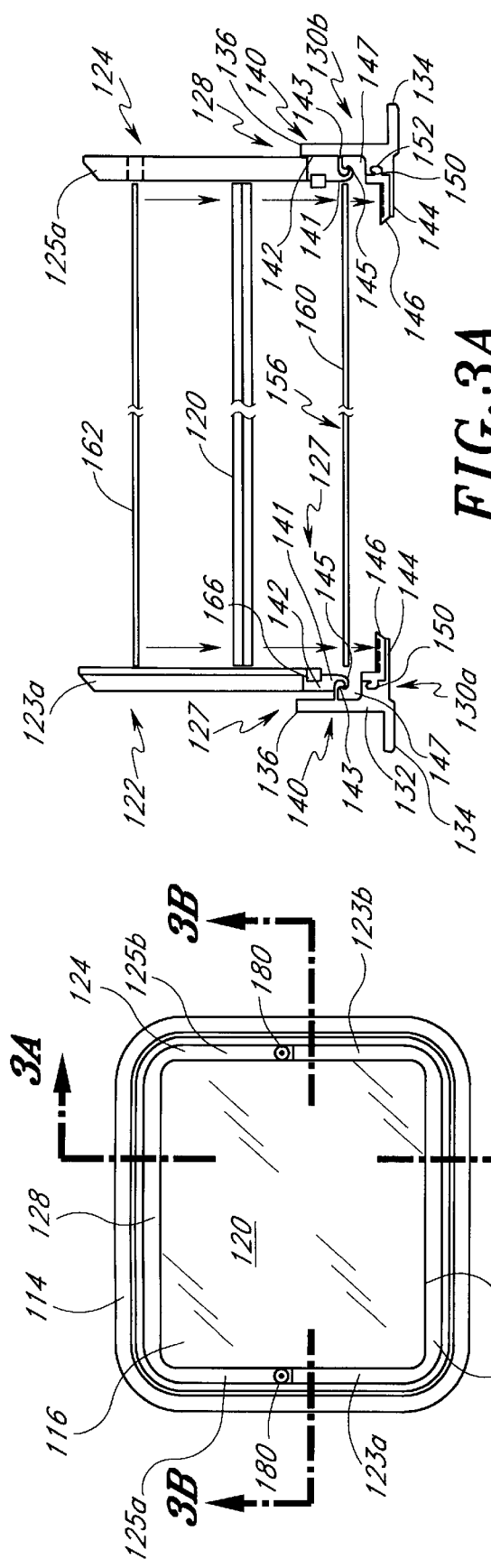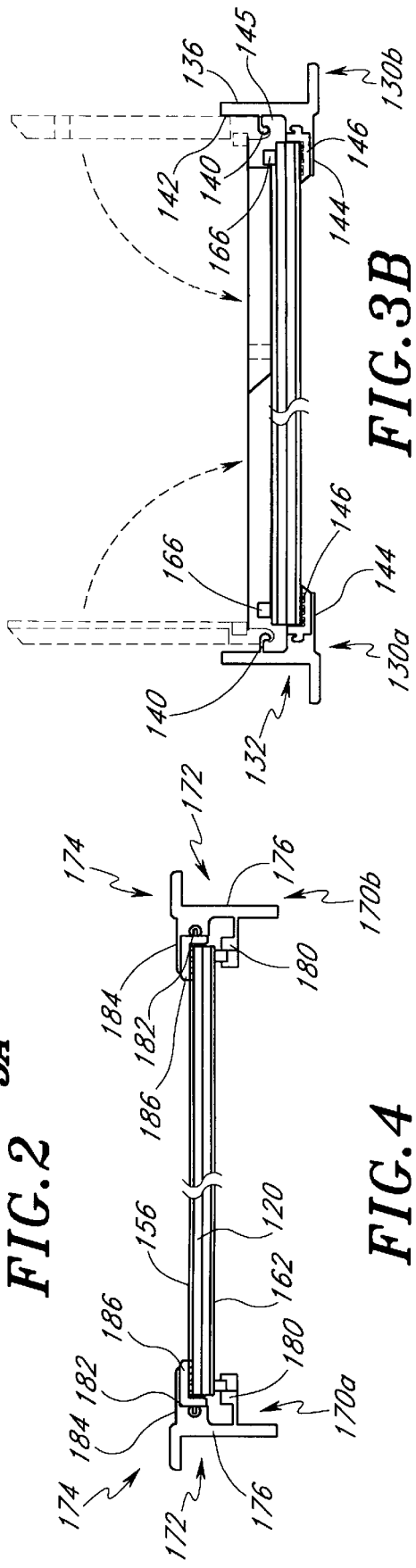

WINDOW PROTECTOR ASSEMBLY

BACKGROUND OF THE INVENTION

1. Field of the Invention

The present invention relates to protective devices for protecting windows from damage and, more specifically, concerns a replaceable window protector assembly adapted to protect and allow replacement of the glazing used in windows in public transportation vehicles, such as buses and trains.

2. Description of the Related Art

It has long been appreciated that vandalism of windows in public transportation vehicles is an on-going problem. Oftentimes, the glazing of windows is damaged by people writing or painting on the glazing of the window with marking pens or spray paint. Further, the exposed glazing of the window may also be damaged as a result of people using sharp instruments to scratch the glazing of the window.

Oftentimes, the interior surface of the glazing is damaged as a result of the actions of individuals sitting inside of the vehicle while the vehicle is moving. However, public transportation vehicles are increasingly being defaced or vandalized while the vehicles are sitting at rest. This can result in additional damage or defacement of the outside of the windows. It will be appreciated that oftentimes the vandalism takes the form of crude or otherwise disagreeable expressions being permanently marked onto the windows. Hence, there is an on-going problem of vandalism and defacement of public transportation vehicles and, in particular, damage or defacement of both the interior and exterior surfaces of the glazing of these windows.

To address this particular problem, various protective devices have been developed. For example, U.S. Pat. No. 5,242,207, which is owned by the assignee of this application, discloses one type of window protector which protects the interior surface of the glazing of the window from damage as a result of vandalism or defacement. In particular, U.S. Pat. No. 5,242,207 discloses a window protector which includes a protective sheet that is positioned against the interior surface of the glazing of the window and is held in place by a plurality of brackets which is attached to the frame of the window. These protective sheets act as a sacrificial surface that protects the glazing of the window from damage as a result of vandalism or defacement. From time to time, the protective sheet can be replaced with a new protective sheet by removing the brackets and positioning the new protective sheet adjacent the inner surface of the glazing of the window.

While the window protector disclosed in U.S. Pat. No. 5,242,207 has been particularly effective in maintaining the integrity of the interior surface of the glazing of the window, this window protector does not provide any protection against damage to the outer surface of the glazing of the window. Moreover, if the protective layer on the interior surface of the window is not periodically replaced, it is possible that the glazing may be permanently damaged despite the best efforts of the window protector to protect the glazing. The window protector disclosed in U.S. Pat. No. 5,242,207 is designed to be used in conjunction with existing window frames such that replacement of the underlying glazing requires removal of the glazing from the existing transportation vehicle window frame. This can be a rather tedious process which increases the cost of maintaining and repairing the public transportation vehicle windows.

From the foregoing, it will be appreciated that there is a need for an improved window protector that is capable of protecting both the interior surface and the exterior surface of the glazing of the window from damage as a result of vandalism or defacement. To this end, there is a need for a window protector that provides protection to the window glazing on both the interior and exterior surfaces of the glazing and also allows for easy and quick access to the protective layers and the glazing itself.

SUMMARY OF THE INVENTION

The aforementioned needs are satisfied by the window protector assembly of the present invention which is comprised of a frame that defines a window opening, a piece of glazing adapted to be positioned within the window opening, a protective layer adapted to be positioned within the window opening so as to be adjacent one side of the glazing, and one or more retainers that are pivotally attached to the frame so as to be moveable between an opened position, which allows the glazing and protective layer to be positioned within the window opening or removed therefrom, and a closed position, wherein the retainer retains the protective layer and the glazing within the window opening. In one embodiment, the one or more retainers are secured to the frame in the closed position by manipulation of a tool activated securing mechanism which is configured to inhibit unauthorized manipulation of the one or more retainers.

In one particular aspect of the invention, the assembly includes a frame that defines a recess that has a first perimeter shape and is adapted to receive an outer protective layer having a perimeter shape substantially equivalent to the first perimeter shape, a piece of glazing having an outer perimeter shape substantially equivalent to the first perimeter shape, and an inner protective layer having an outer perimeter substantially equal to the first perimeter shape. The pivoting retaining members are preferably attached to the frame such that the pivoting retaining members also define an outer perimeter shape which is substantially equal to the first perimeter shape such that, when the retaining members are in the closed position, the retaining members exert force against substantially the entire outer perimeter of the outer protective layer, the glazing, and the inner protective layer to thereby retain the protective layers and the glazing within the opening of the frame. In this embodiment, because the retaining members cover substantially the entire outer perimeter of the protective layers and the glazing in the closed position, the edges of the protective layers and the glazing are not readily accessible to an unauthorized individual with the retaining members in the closed position.

In one embodiment, the frame has an interior surface that is positioned within the opening that is to receive the protective layers and the glazing. One or more pivot points are mounted on the interior surface such that the pivoting retaining members can be pivotally attached to the one or more pivot points. The one or more pivot points are preferably located on the interior surface in a location such that, when the pivoting retaining members are positioned in the closed position, the pivot points are enclosed by the frame and the pivoting retaining members such that access to the pivot points, when the pivoting retaining members are in the closed position, is inhibited. In this way, the likelihood of an unauthorized person removing the retaining members by damaging the pivot points is reduced.

Because the retaining members retain the protective layers and the glazing within the recess defined by the frame, removal and replacement of the protective layers and the glazing is simplified as compared to similar replacements using window protectors of the prior art. In particular, the user simply has to pivot the retaining members from the closed position to the opened position such that the protective layers and the glazing are exposed and then remove these layers from the recess defined by the frame. The simplified removal of the glazing and the protective layers permits replacement of the glazing and also allows for easy installation of an exterior protective sheet which has not been readily accomplished in designs of the prior art. These and other objects and advantages of the present invention will become more fully apparent from the following description taken in conjunction with the accompanying drawings.

BRIEF DESCRIPTION OF THE DRAWINGS

FIG. 2 is an inside elevational view illustrating the window protector assembly of FIG. 1;

FIGS. 3A and 3B are cross-sectional views of the window protector assembly of FIG. 2 taken along the lines of 3—3;

FIG. 4 is a cross-sectional view of the window protector assembly of FIG. 2 taken along the lines 4—4;

DETAILED DESCRIPTION OF THE PREFERRED EMBODIMENT

Figure 1:
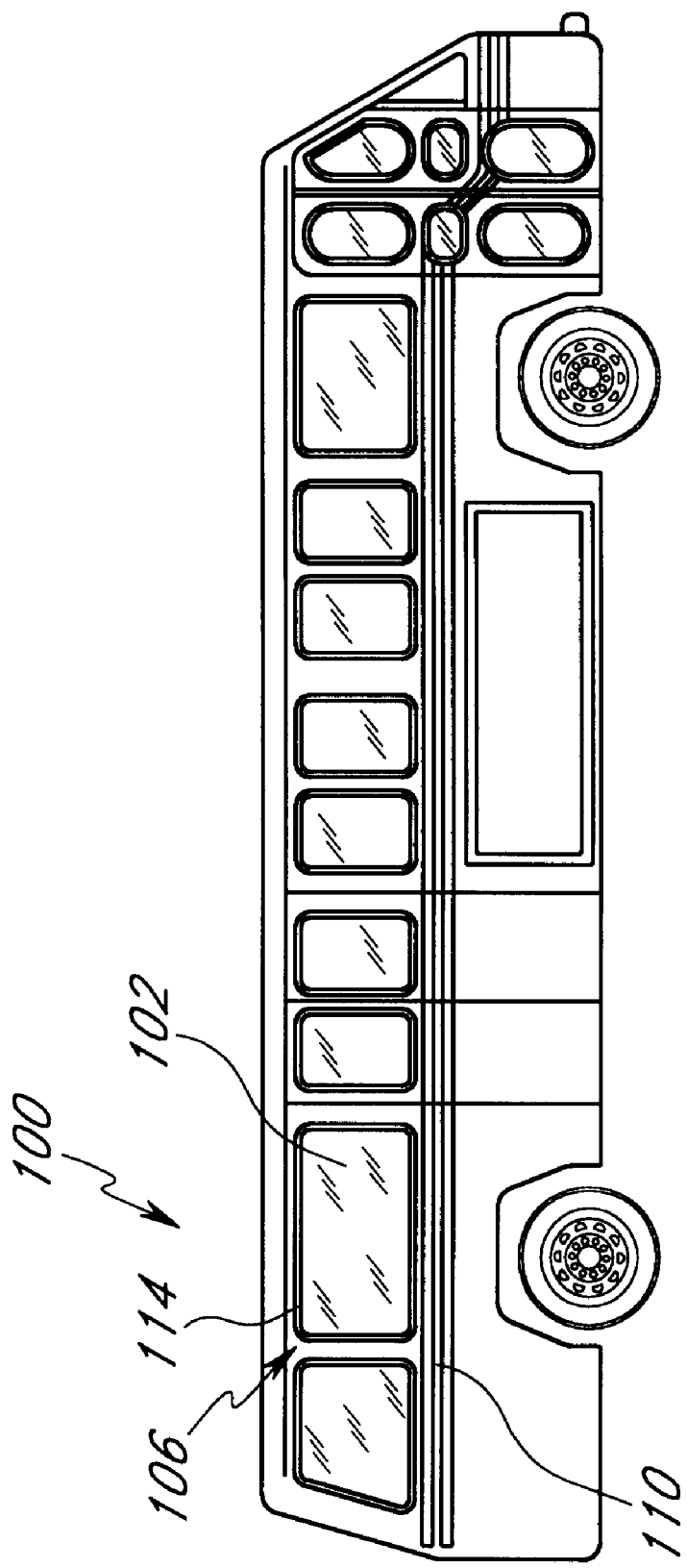
FIG. 1 is an elevational view illustrating a public transportation vehicle incorporating windows having an embodiment of a window protector assembly of the present invention.

Reference will now be made to the drawings wherein like numerals refer to like parts throughout. FIG. 1 illustrates an exemplary public transportation vehicle 100 that incorporates windows 102 having window frames 114 mounted within openings 106 in the side wall 110 of the vehicle 100. It will be appreciated from the following discussion that, while the window protector assembly of this embodiment is described in connection with a bus, that the window protector assembly 112 can be used in a number of different applications including other types of public transportation vehicles and also in windows that are positioned in fixed environments, such as buildings, where the window is likely to be damaged or defaced through vandalism. As will be also apparent from the following discussion, the window protector assembly of the preferred embodiment is designed to both protect the glazing of the window and also to facilitate rapid change and replacement of protective sheets and the glazing of the window protector assembly.

Referring to FIG. 2, one embodiment of a window protector assembly 112 is illustrated. In this embodiment, the window protector assembly 112 incorporates a frame 114 that is adapted to mount within the opening 106 in the side wall 110 of the vehicle 100 in a well-known manner. The frame 114 defines an opening 116 into which one or more pieces of glazing 120 are to be positioned. As will be understood, the term "glazing" refers to either glass windows or windows formed of any other generally transparent or translucent material.

In this embodiment, a first retaining member 122 and a second retaining member 124 are pivotally mounted to the frame 114 so as to be positioned about the outer perimeter of the opening 116 in the frame 114. As is shown in FIG. 2, the first retaining member 122 is generally U-shaped having two arms 123a, 123b that extend along the side walls of the frame 114 and pivoting section 127. Similarly, the second retaining member 124 is also generally U-shaped having a pivoting section 128 and two arms 125a, 125b that also extend along the side walls of the frame 114 so as to engage with the two arms 123a, 123b of the first retaining member 122. The engagement between the arms 123a, 123b of the first retaining member 122 and the arms 125a, 125b of the second retaining member 124 secures the glazing and protective layers within the opening 116 of the frame 114 in a manner that will be described in greater detail below.

As will also be described in greater detail below in reference to FIGS. 5A and 5B, the pivoting section 127 of the first retaining member 122 and the pivoting section 128 of the second retaining member 124 are pivotally attached to the frame 114 so as to be pivotable between a closed position, as shown in FIG. 2, and an opened position whereby the outer perimeter of the glazing 120 and any protective layer is exposed. As is shown in FIG. 2, the arms and pivoting sections of the first retaining member 122 and the second retaining member 124 are selected to have a width sufficient so as to fully cover the outer edge of the glazing 120 and any protective layers positioned within the opening 116 of the frame 114.

FIGS. 3A and 3B illustrate the interconnection between the first retaining member 122 and the second retaining member 124 and corresponding sections of the frame 114. In particular, as illustrated in FIGS. 3A and 3B, the frame 114 includes an upper frame section 130a and a lower frame section 130b. The upper and lower frame sections 130a, 130b have an L-shaped section 132 that is suitable for mounting in the opening 106 of the side wall 110 of the vehicle 100. In particular, the L-shaped section 132 has an exterior lip 134 that is adapted to mount flush against the outer surface of the side wall 110 of the vehicle adjacent the window openings 106. The L-shaped section 132 further includes a laterally extending member 136 that is adapted to be positioned adjacent the inner walls of the openings 106 in the side walls 110 of the vehicle so as to extend substantially through the opening 106.

A pivoting member 140 is formed on an inner wall 142 of the laterally extending member 136 so as to extend perpendicularly outward therefrom into the opening 116 defined by the frame 114. As will be described in greater detail below, the pivoting member 140 extends the full length of the upper frame section 130a and the lower frame section 130b, and provides a surface to which the pivoting section 127 of the first retaining member 122 and the pivoting section 128 of the second retaining member 124 can be respectively attached to the frame 114 of the window protector assembly 112.

The L-shaped section 132 also defines a seating member 144 that extends inward into the opening 116 defined by the window frame 114. The seating member 144 is adapted to receive a seal 146 that is retained in the seating member 144 as a result of a deformable section 150 of the seal 146 being positioned within an opening 152 formed in the seating member 144 of the upper and lower frame members 130a, 130b. Hence, the seal 146 is press-fit within the seating member 144 of the upper frame section 130a and lower frame section 130b. It will be appreciated that while the upper and lower frame sections 130a, 130b have been described as being comprised of a plurality of discrete components, in the illustrated embodiment, the upper frame section 130a and the lower frame section 130b are comprised of a single uniform component preferably formed of extruded or molded aluminum.

The pivoting members 140 are positioned on the inner surface 142 of the L-shaped section 132 so that the pivoting member 140 is positioned within the opening 116 of the window frame 114. The pivoting sections 127 and 128 of the retaining members 122 and 124 define an opening 141 that receives the pivoting member 140 to permit the pivoting movement of the retaining members 122 and 124. More particularly, the pivoting member 140 defines a ball 143 at its distal end that extends outwardly towards the outer surface of the window frame 114. Since the pivoting member 140 is positioned on the inside surface of the L-shaped section 132 of the frame 114, access to the interconnection between the retaining members 122 and 124 and the pivoting members is inhibited. Moreover, an end portion 145 of each of the retaining members 122, 124 is adapted to be flushly positioned within a recess 147 (FIGS. 3A and 3B) when the retaining members 122, 124 are in the closed position so that access to the interconnection between the retaining members 122, 124 is further inhibited. In this way, the likelihood of a person prying the retaining members 122, 124 free from the pivoting members 140 and thereby dismantling or damaging the window protector assembly 112 is inhibited.

As is illustrated in FIGS. 3A and 3B, the first retaining member 122 and the second retaining member 124 can be pivoted about the pivoting members 140 so as to extend outward from the opening 116. This allows a protective sacrificial sheet 156 to be positioned within the opening 116 on the seal 146. Subsequently, one or more pieces of glazing 120 can be positioned on an inner surface 160 of the protective sheet 156 in the manner shown in FIGS. 3A and 3B. Subsequently, an inner sacrificial protective sheet 162 can be positioned on an inner surface 164 of the glazing 120. The first and second retaining members 122, 124 can then be pivoted into the closed position as shown in FIG. 3B. The first and second retaining members 122, 124 further include an inner seal 166 which extends entirely around the perimeter of the opening 116 so that the inner seal 166 makes contact with the inner sacrificial protective sheet 162 in the manner shown in FIG. 3B.

FIG. 4 is a cross-sectional view which illustrates the side frame sections 170a, 170b of the frame 114. The side frame sections 170a, 170b are integrally connected to the upper and lower frame sections 130a, 130b so that the entire frame 114 is a single integral piece. The side frame sections 170a, 170b are also configured to have an L-shaped section 172 that has a side wall member 174 that is adapted to be flushly positioned against the outer side wall 110 of the vehicle 100 adjacent the window opening 106. The L-shaped section 172 also has a laterally extending section 176 that extends inward through the opening 116 of the frame 114 in the same manner as the laterally extending section 136 of the upper and lower frame sections 130a, 130b as described above. A bracing member 180 extends inwardly into the opening 116 of the frame 114 so as to provide a bracing contact so that the first and second retaining members 122, 124 will be positioned adjacent the bracing member 180 when the retaining members 122, 124 are in the closed position. As is also illustrated in FIG. 4, the side frame sections 170a, 170b include a seating member 184 that extends inward into the opening 116 from the inner surface 182 of the laterally extending section 176. The seating member 184 is adapted to receive one or more seals 186 that extend laterally around the perimeter of the window.

As illustrated in FIGS. 3A and 4, the protective sacrificial sheet 156 is positioned adjacent a seal 186 which is retained in the side frame members 170a, 170b in substantially the same manner as discussed above in connection with the seal 146 and the upper and lower frame members 130a, 130b. The glazing 120 is then positioned adjacent the outer sacrificial layer 156 and the inner protective sheet 162 is then positioned adjacent the inner surface 164 of the glazing 120 in the same manner as described above in connection with FIGS. 3A and 3B. As illustrated in FIG. 4, when the first and second pivoting retaining members 122, 124 are in the closed position, the one or more seals 166, are positioned adjacent the inner sacrificial protective sheet 162. In one embodiment, the window 110 is square in which case the seals are comprised of a plurality of pieces. In another embodiment, the window 110 is curved and the seals comprise a single seal.

Figure 5A:
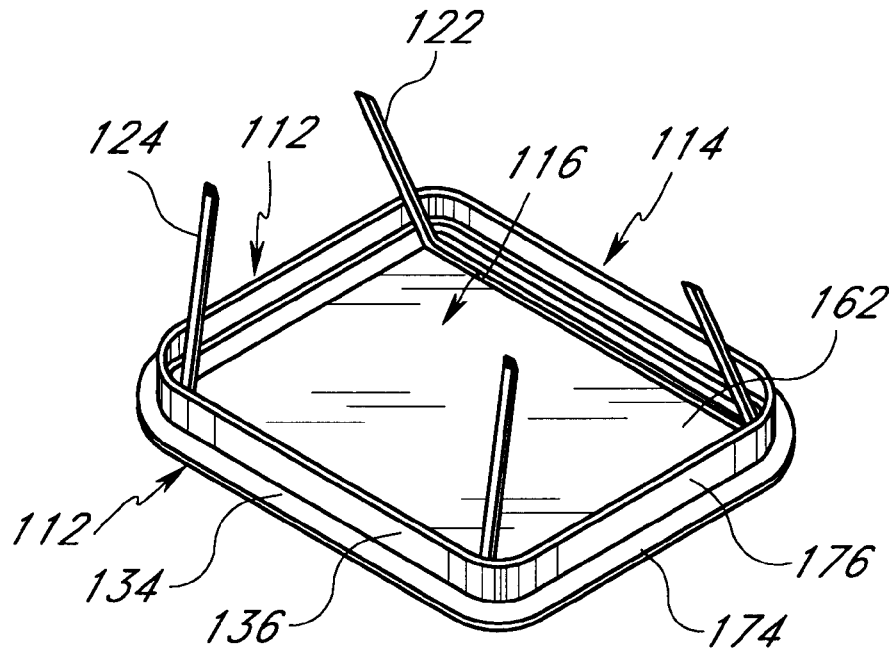
FIGS. 5A and 5B are perspective views of the window protector assembly of FIG. 2, illustrating the assembly in both a closed and an opened configuration.
Figure 5B:
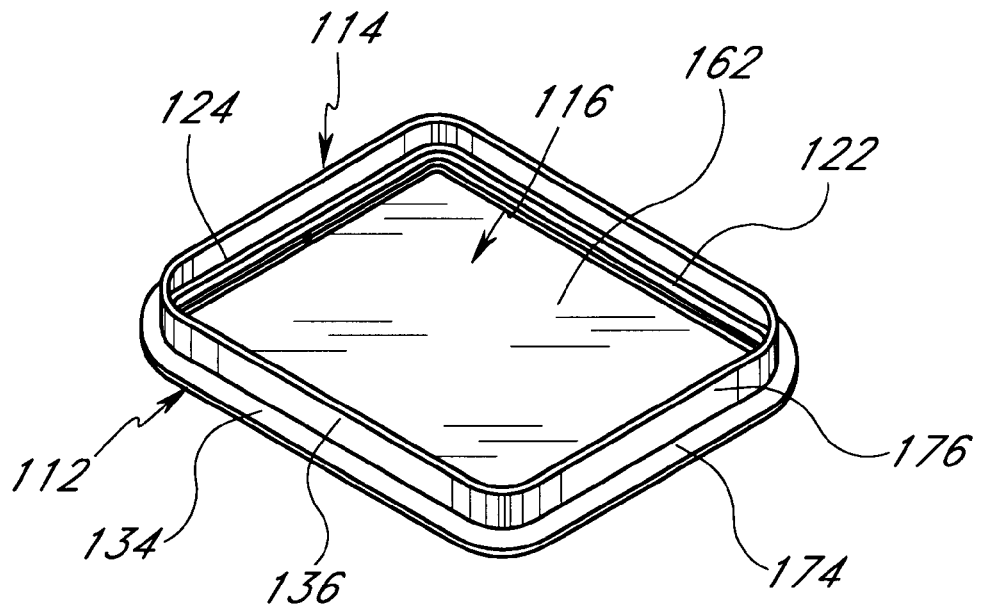

As is shown in FIGS. 2, 5A and 5B, the frame 114 is comprised of a single uniform piece that is comprised of the upper and lower sections 130a, 130b and the side sections 170a, 170b. The retaining members 122, 124 are pivotally attached and define retaining surfaces that extend about the outer perimeter of the opening 116 defined by the frame 114 so as to overlap the outer perimeter of the glazing 120 and the protective sheets 156, 162. The seating member 144 of the upper and lower frame sections 130a, 130b and the seating member 184 of the side frame sections 170a, 170b also extend into the opening 116 defined by the frame 114 so that the protective sheets 156, 162 and the glazing 120 can be securely retained in the opening 116 of the frame 114 by the retaining members 122, 124 pressing the protective sheets 156, 162 and the glazing 120 against the seating members 144, 184 about substantially the entire perimeter of the glazing 120 and the protective sheets 156, 162.

FIGS. 5A and 5B further illustrate the configuration and operation of the window protector assembly 112. In particular, as illustrated in FIG. 5A, the first and second retaining members 122, 124 are pivotable with respect to the upper and lower frame sections 130a and 130b thereby removing the first and second retaining members 122, 124 from the outer perimeter of the outer sacrificial layer 156, the glazing 120, and the inner sacrificial layer 162. This allows each of these layers to be lifted out of the opening 116 defined by the frame 114.

As shown in FIG. 5B, when the first and second retaining members 122, 124 are closed, they are positioned about the outer perimeter of the outer protective layer 156, the glazing 120 and the inner protective layer 162 thereby capturing these three layers adjacent the seal positioned on the inner sections of the frame 114. As the outer perimeter of the sacrificial protective layers 156, 162 and the glazing 120 is covered by the pivoting retaining members 122, 124, these layers cannot be removed without moving the first and second retaining members 122, 124 into the open position illustrated in FIGS. 3A and 5A. In this embodiment, the sacrificial protective layers 156 and 162 are comprised of an acrylic material that is adapted to be positioned adjacent the exposed surfaces of the glazing 120 such that the exposed surfaces of the glazing 120 on both the inside and the outside of the window is covered by the protective layers 156, 162. In this way, damage to the more expensive glazing 120 as a result of vandalism or defacement is inhibited as the protective acrylic layers provide protection against such damage.

Figure 6A:
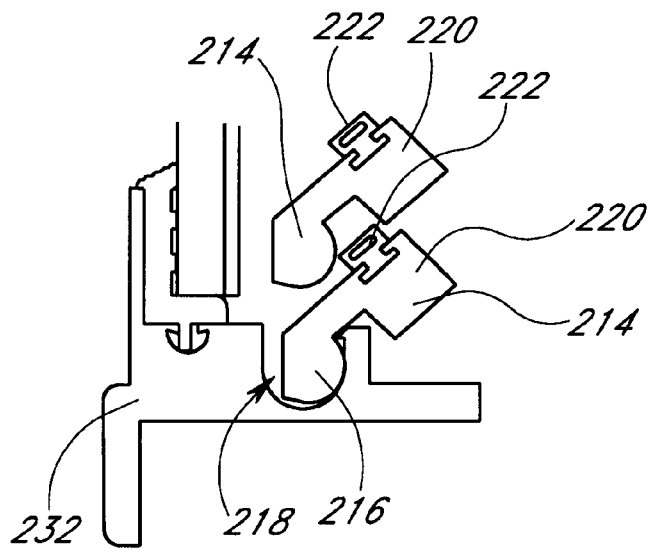
FIGS. 6A and 6B are cross-sectional views of another embodiment of the window protector assembly of FIG. 2 illustrating another interconnection between retaining members of the window protector assembly and the frame of the window protector assembly.
Figure 6B:
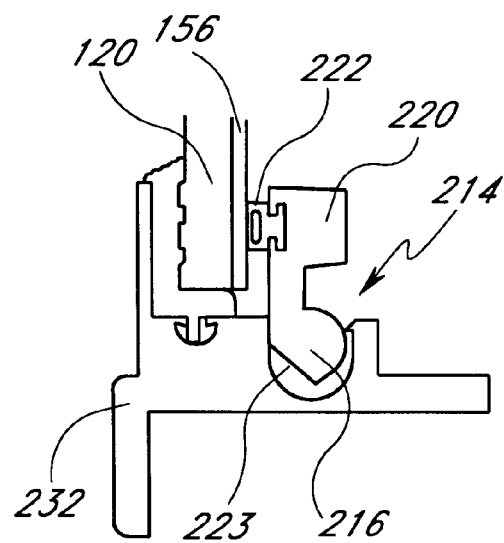

FIGS. 6A and 6B illustrate an alternate embodiment of the retaining members and their attachment to the frame of the window frame assembly. In particular, FIGS. 6A and 6B illustrate an alternate embodiment of the portions 127, 128 of the retaining members 122, 124 that pivotally attach the retaining members to the window frame. Specifically, in this embodiment, a retaining member 214 has a ball 216 formed on a first end that is adapted to be positioned within a recess 218 formed on an L-shaped section 232 of the frame. The embodiment of FIGS. 6A and 6B is substantially similar to the embodiment of FIGS. 3A and 3B except that the retaining members in this embodiment have the rotatable ball formed thereon and the recess is formed in the L-shaped section 232 of the frame as opposed to the other way around as described above in connection with FIGS. 3A and 3B.

As is also illustrated in FIGS. 6A and 6B, the retaining member has a seal portion 220 that receives a seal 222. The ball portion 216 is rotatable within the recess 218 between an open and a closed position. In the closed position, the radius of the ball 216 prevents removal of the retaining member 214 from the recess 218. However, the ball 218 has a flat surface 223 that decreases the radius of the ball 216 with respect to the opening of the recess 218 when the retaining member 214 has been moved to the open position as shown in FIG. 6A. Hence, the retaining member can be fully removed from engagement with the frame thereby permitting easy removal and installation of the retaining members.

When the retaining members are in the closed position, a securing mechanism, such as the mechanism illustrated in FIGS. 7 and 8y hereinbelow can be used to secure the retaining members in the closed position. In the closed position, the seal 222 engages with the inner protective sheet 156 so as to secure the protective sheets and glazing within the window frame in substantially the same manner as described above.

Figure 7:
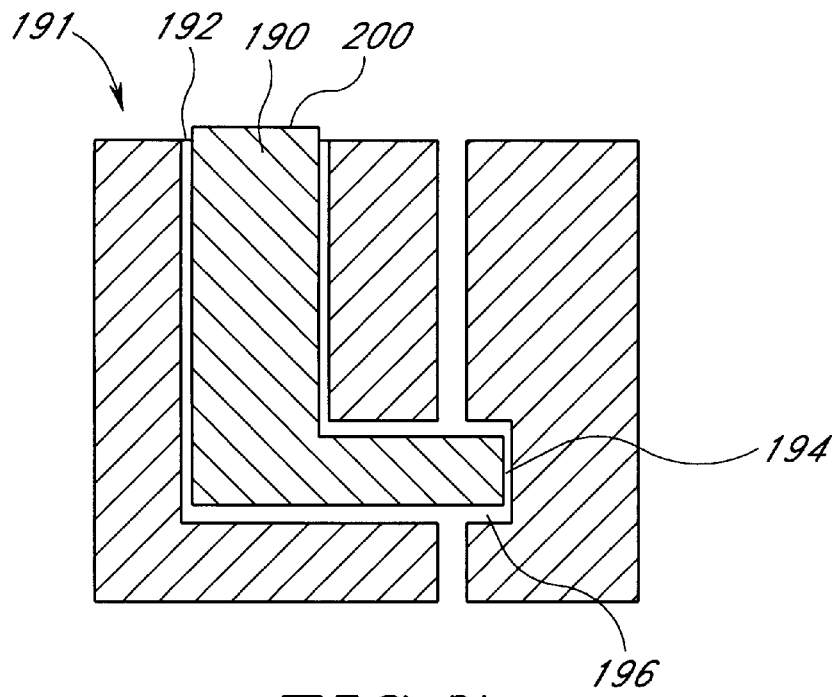
FIG. 7 is a side cross-sectional view of a securing mechanism of the assembly of FIG. 2.

FIG. 7 illustrates a securing mechanism 191 that is adapted to secure the first and second retaining members 122, 124 in a locked and closed position. In particular, as illustrated in FIGS. 3A and 3B, the outer edge of the arms 123a, 123b of the first retaining member 122 and outer edge of the arms 125a, 125b of the second retaining member 124 are beveled so that the outer tip 183 of the arms 125a, 125b of the second retaining member 124 is positioned over the outer tip 185 of the arms 123a, 123b of the first retaining member 122 when the first and second retaining members are positioned in the closed position in the manner shown in FIGS. 3B and 5B. A securing member 190 is positioned within an opening 192 in both the arms 125a, 125b of the second retaining member 124. Preferably, the securing member 190 is pivotable within the opening 192 such that a laterally extending arm 194 of the securing member 190 can be positioned within an opening 196 formed in a side wall of the frame 114.

Figure 8:
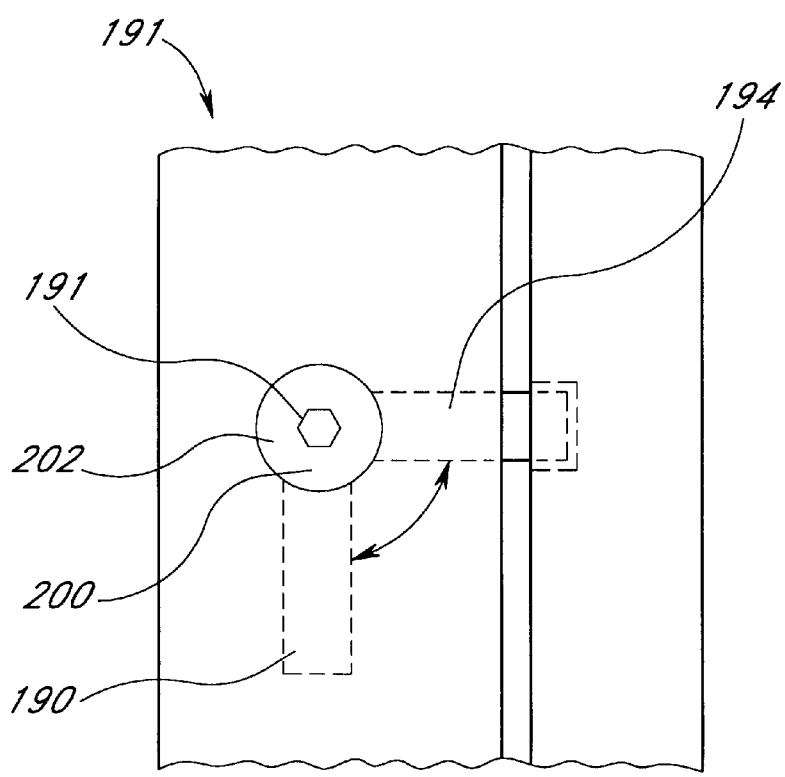
FIG. 8 is a top view of the securing mechanism of FIG. 1.

In this embodiment, the opening 196 is preferably formed in the bracing member 180 and has a curved opening to permit the extending arm 194 to be rotated into the opening 196 in response to the user turning the securing member 190. As illustrated in FIG. 8, the securing member 190 is preferably pivotable between an opened position and a closed position wherein the laterally extending member 194 is positioned within the opening 196 and the frame 114 in the closed position and is retracted from the opening 196 in the opened position.

As is also illustrated in FIG. 8, the outer face 200 of the securing member 190 includes a tool recess 202 that is adapted to receive only a specially configured tool (not shown) such that manipulation of the securing member 190 between the opened and closed positions can preferably only be accomplished by an authorized person possessing a specially configured tool. As is illustrated in FIG. 2, there are preferably two securing members 190 positioned in both of the outer ends of the arms 125a, 125b of the second retaining member 124 to secure the second retaining member 124 in the closed position adjacent the frame 114. As discussed above, because the outer end 183 of the second retaining member 124 overlaps the outer end 185 of the first retaining member 122, securing the second retaining member 124 in the closed position against the frame 114 in the manner shown in connection with FIGS. 7 and 8 results in the first retaining member 122 similarly being secured in the closed position.

Advantageously, it is simple to remove and replace the inner sacrificial layer 162 and the outer sacrificial layer 156 and the glazing 120 by simply manipulating the retaining members 122, 124 into the open position and extracting each of the layers positioned within the opening 116 of the frame 114. Hence, the window protector assembly 112 of the illustrated embodiment allows for simpler and easier replacement of the protective layers 156, 162 and the glazing 120 as compared to similar protective devices of the prior art. As a result of permitting such easy access and replacement, it is now possible to have a protective layer positioned on the outer surface of the glazing 120 in addition to a protective surface on the inner surface of the glazing 120. However, it will also be appreciated that the window frame and protector 112 of the present invention can be used with only an inner protective layer 162 without departing from the spirit of the present invention.

Hence, the window protector 112 of the present invention allows for easier replacement of protective sheets as compared to window protective devices of the prior art. This easier access facilitates the use of a protective layer on the outside surface of the glazing as replacement of this sheet is now simplified due to the ease of access provided by the window protector assembly of the preferred embodiment.

Although the illustrated embodiments of the present invention have shown, described and pointed out the fundamental novel features of the invention, as applied to these embodiments, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appended claims.

What is claimed is:

1. A window protector assembly mounted in a vehicle adapted to protect the glazing of a window from damage or defacement by vandalism, the assembly comprising:

a frame mounted within an opening of the vehicle, the frame defining a window opening and a transverse surface that is perpendicular to the plane of the window opening, wherein the frame further includes a pivoting member and a seating member mounted on the transverse surface;

a first protective sheet adapted to be positioned adjacent a first side of the glazing of the window, wherein the glazing of the window and the first protective sheet are positioned adjacent the seating member in the window opening of the frame;

at least one retaining member pivotally attached to the pivoting member of the frame so that an interconnection between the at least one retaining member and the pivoting member is recessed within the window opening to thereby inhibit access to the interconnection by a person sitting adjacent the window wherein, the at least one retaining member being movable between a closed position, wherein the at least one retaining member secures the first protective sheet and the glazing against the seating member in the window opening of the frame and an opened position, wherein the glazing and the first protective sheet are exposed in the window opening and can be removed therefrom.

2. The assembly of claim 1, wherein the window opening of the frame has a first perimeter and wherein the seating member extends inward from the lateral surface of the frame into the window opening.

3. The assembly of claim 2, wherein the at least one retaining member extends substantially around the first perimeter so as to exert force against the first protective sheet and the glazing to retain the outer perimeter of the first protective sheet and the glazing against the seating member.

4. The assembly of claim 1, further comprising a second protective sheet adapted to be positioned in the frame adjacent a second side of the glazing of the window so that both sides of the glazing are protected by the first and second protective sheets.

5. The assembly of claim 4, wherein the first and second protective sheets comprise sacrificial acrylic sheets that are adapted to be replaced so as to inhibit damage to the glazing.

6. The assembly of claim 1, wherein the at least one retaining member is comprised of a first and a second U-shaped retaining members that are pivotally attached to the frame so as to extend substantially around the first perimeter of the frame when in the closed position.

7. The assembly of claim 6, wherein the first and second U-shaped retainers have first and second arms with beveled ends, wherein the beveled ends of the first and second arms of the first U-shaped retainer are positioned underneath the beveled ends of the first and second arms of the second U-shaped retainer when the first and second U-shaped retainers are in the closed position.

8. The assembly of claim 7, wherein at least one securing device is attached to the first U-shaped retainer so as to retain the first U-shaped retainer in the closed position.

9. The assembly of claim 8, wherein the first U-shaped retainer has at least one opening and wherein the securing device comprises a securing member mounted within the at least one opening in the first U-shaped retainer so as to be rotatable therein and wherein the securing member further includes a lateral member that rotates between a first position where the lateral member engages with the frame to retain the first U-shaped retainer in the closed position and a second position wherein the lateral member disengages with the frame to permit the first and second U-shaped members to be moved into the opened position.

10. The assembly of claim 9, wherein the securing member has a first exposed face that has an opening adapted to receive a tool having a first configuration so that positioning the tool having the first configuration into the opening permits manipulation of the securing member between the first and second positions.

11. A window protector assembly for protecting the glazing of a window in a vehicle, the assembly comprising:
the frame adapted to be mounted in a window opening in the vehicle, the frame defining an opening, wherein the frame includes a seating member extending into the opening;
a first protective sheet adapted to be positioned adjacent a first side of the glazing of the window, wherein the glazing of the window and the first protective sheet are positioned adjacent the seating member in the opening; and
at least one retaining member pivotally attached to the frame so as to be movable between an opened position, wherein the glazing and the first protective sheet can be removed from the opening of the frame and a closed position, wherein the at least one retaining member secures the first protective sheet and the glazing against the seating member in the opening.

12. The assembly of claim 11, wherein the opening of the frame has a first perimeter and wherein the seating member extends inward from the frame into the opening.

13. The assembly of claim 12, wherein the at least one retaining member extends substantially around the first perimeter so as to exert force against the first protective sheet and the glazing to retain the outer perimeter of the first protective sheet and the glazing against the seating member.

14. The assembly of claim 11, wherein the frame includes a pivot member and wherein the at least one retaining member is attached to the pivot member so as to pivot between the opened and closed position and wherein the at least one pivot member is located on the frame so that when the at least one retaining member is in the closed position, the at least one pivot member is less accessible to a person sitting adjacent an interior surface of the window.

15. The assembly of claim 14, wherein the frame includes a transverse section that is adapted to extend through the wall of the vehicle and the pivot member is mounted on the transverse section so that the pivot member is recessed into the frame when the at least one retaining member is in the closed position.

16. The assembly of claim 11, wherein the at least one retaining member is comprised of a first and a second U-shaped retaining members that are pivotally attached to the frame so as to extend substantially around the first perimeter of the frame when in the closed position.

17. The assembly of claim 16, wherein the first and second U-shaped retainers have first and second arms with beveled ends, wherein the beveled ends of the first and second arms of the first U-shaped retainer are positioned underneath the beveled ends of the first and second arms of the second U-shaped retainer when the first and second U-shaped retainers are in the closed position.

18. The assembly of claim 17, wherein at least one securing device is attached to the first U-shaped retainer so as to retain the first U-shaped retainer in the closed position.

19. The assembly of claim 18, wherein the first U-shaped retainer has at least one opening and wherein the securing device comprises a securing member mounted within the at least one opening in the first U-shaped retainer so as to be rotatable therein and wherein the securing member further includes a lateral member that rotates between a first position where the lateral member engages with the frame to retain the first U-shaped retainer in the closed position and a second position wherein the lateral member disengages with the frame to permit the first and second U-shaped members to be moved into the opened position.

20. The assembly of claim 19, wherein the securing member has a first exposed face that has an opening adapted to receive a tool having a first configuration so that positioning the tool having the first configuration into the opening permits manipulation of the securing member between the first and second positions.

21. The assembly of claim 11, further comprising a second protective sheet adapted to be positioned adjacent a second side of the glazing of the window so that both sides of the glazing are protected by the first and second protective sheets.

22. The assembly of claim 21, wherein the protective sheets comprise sacrificial acrylic sheets that are adapted to be replaced so as to inhibit damage to the glazing.

* * * * *